March 8, 1927.　　　　　H. N. ANDERSON　　　　　1,619,963

TOOTHED GEAR

Filed March 5, 1923

INVENTOR.
Harold N. Anderson,
BY F. K. Fassett,
ATTORNEY.

Patented Mar. 8, 1927.

1,619,963

UNITED STATES PATENT OFFICE.

HAROLD N. ANDERSON, OF CLEVELAND, OHIO.

TOOTHED GEAR.

Original application filed July 26, 1920, Serial No. 399,043. Divided and this application filed March 5, 1923. Serial No. 622,869.

My present invention relates to improvements in gears, whereby smoother action and greater freedom from vibration and noise is obtained in toothed gearing than is possible with ordinary gears, even though the latter be very well made, or even practically perfect, theoretically. This application is a division from my application Serial No. 399,043 now in the Patent Office.

The essence of my present invention resides in giving to the teeth of gears a form such that as successive teeth come into action they assume their load gradually rather than suddenly. While the manufacture of such gears is not limited to any particular method, I shall describe my improved gears in connection with the method of forming their teeth which consists in rolling the blank whereon the teeth are to be formed, against a toothed die or master gear. This method of forming teeth on gears is described in several U. S. patents that have been granted to me, which patents will be referred to later.

The art of rolling teeth on gears is based on the principle that since two gears having properly constructed teeth are adapted to roll together at a definite velocity ratio, it follows that if one such gear is rolled in contact with a plastic or malleable blank, while a required velocity ratio is maintained between the gears and blank, the teeth of the gear will form teeth on the blank such as will enable the blank later to function properly with any other gear having teeth of the correct size and shape. My various gear rolling machines are therefore devices whereby to roll a finish gear, which I call a die, or die roll, against heated blanks, meanwhile maintaining proper velocity ratio between the die and blank. Before proceeding to describe my present invention I wish to point out certain characteristics pertaining to gear teeth. While there are several known systems of toothed gearing, only involute gears will be considered in the present application.

The teeth of a rotary involute gear are constructed on what is known as a base circle, and the faces of the teeth have the form of an involute evolved from said circle. The teeth therefore have more or less curvature according to the number of teeth in the gears; the teeth of a 15 tooth involute gear have a very pronounced curvature, while in a 150 tooth gear the curvature is but slight. In a 300 tooth gear the curvature is almost nil. There is another type of involute gear, called a rack, in which the teeth are constructed on a plane instead of a circle, and the faces of the teeth have no curvature whatever. The rack is a sequel of the fact that the larger the number of teeth in a gear, the larger will be its base circle, and that the nearer the base circle approaches a straight line the straighter are the faces of the teeth. In fact, a rack is often likened to a gear having an infinite number of teeth formed on a base circle of infinite radius.

In my Patent No. 1,001,799 I showed a machine for rolling gears, in which the die was substantially a rotary spur gear; in my Patent No. 1,240,918 the die is substantially a bevel gear. In each of these machines, therefore, according to the foregoing explanation, the faces of the die teeth are curved. In Patent No. 1,240,913 I showed a machine for rolling gears, in which the die was a rack, the teeth of the die therefore having flat faces. In Patent No. 1,250,916 I showed a machine for rolling bevel gears, in which the die roll was a crown gear. A crown gear is called a circular rack and its teeth have flat faces. Theoretically, the teeth of an involute crown gear are not absolutely flat, but since their curvature is so slight as almost to defy detection it is universally regarded as negligible and the teeth are always formed with flat faces.

In forming gear teeth by my rolling process the teeth are in fact generated. Rolling the toothed die against the blank while maintaining between the die and blank a fixed velocity ratio, results in forming teeth on the blank whose contour is conjugate to that of the die. If the die teeth have a true involute form the teeth generated by them on the blank will have the form of a true involute. But it is possible to modify the form of the resulting gear tooth by making the necessary modifications in the die. And thus it is possible to utilize the rolling method for making my improved gears. Before describing my improved gears I shall describe the manner of making them, referring to the accompanying drawing, in which, Fig. 1 is an assemblage of one of my new dies and parts with which it is closely associated.

Figure 1:
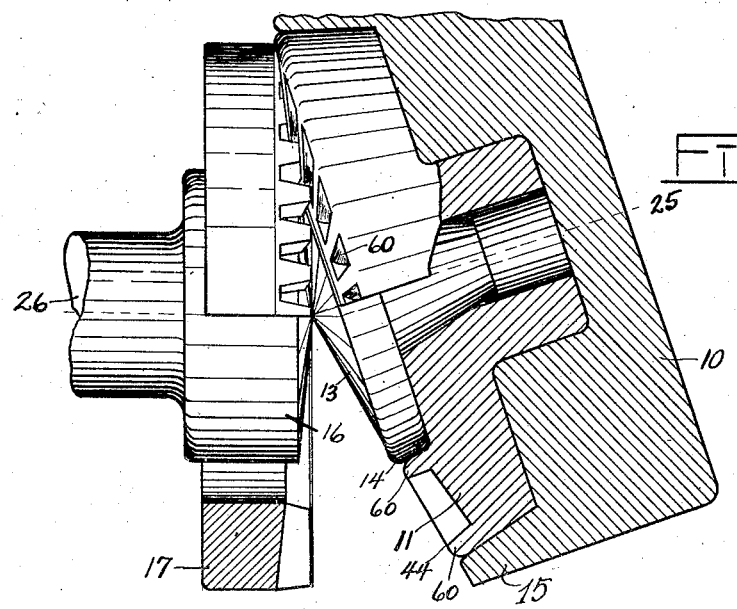

Referring now to Fig. 1, the numeral 10 designates a holder in which is carried a bevel gear blank 11. The rolling of teeth on the blank has been completed but the die roll is still in position with its teeth embedded in the blank. The blank is held in the holder by a circular block 13, which serves not only this purpose but also it serves as a shroud to limit the lateral flow of metal as the teeth are formed. The portion of the block that acts as a shroud is seen at 14. The holder 10 has an annular extension 15 that acts as a shroud to limit the lateral flow of metal at the outside of the blank. The block 13 has a conical face which preferably, though not necessarily, coincides with the pitch cone of the finished blank; and this block is pressed into the blank by a block 16 having a conical face coinciding with the pitch cone of the die roll 17. The parts so far described are shown, together with the manner in which they are supported and operated, in my Patent No. 1,240,916 previously referred to. It will be sufficient, therefore, at this time to say that the holder 10 is mounted on a shaft which rotates on an axis indicated by the center line 25 and the die 17 is mounted to rotate on an axis indicated by the center line 26; while the holder and die are compelled to maintain a fixed speed ratio by timing gears not shown. In addition to its rotary motion the die is arranged to move to and fro with reference to the blank in directions parallel to axis 26, this movement being effected without interfering with the rotary motion of the parts. Provision is also made for moving the block 16 for clamping the blank in the holder. While the heated blank is being inserted in the holder the block 16 and die 17 are withdrawn a suitable distance, and after the blank is in place the block 13 is inserted in the blank and the block 16 brought up into contact with it. The die and holder are then started to rotating and the die advances toward the blank until its teeth have sunk to the required depth in the metal, thus generating teeth on the blank.

It is to be understood that the foregoing description is only for the purpose of rendering the succeeding description of my invention easily understood, but that it is by no means the only or even preferred arrangement that may be employed. It is used here because of its simplicity.

Figure 2:
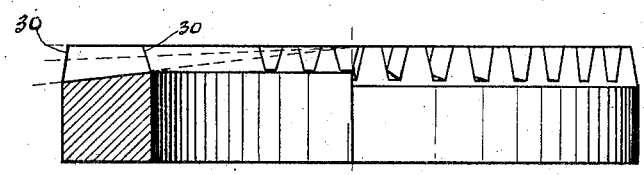
Fig. 2 is a side view, partly in section, of a die for rolling bevel gears having teeth of my improved form.
Figure 3:
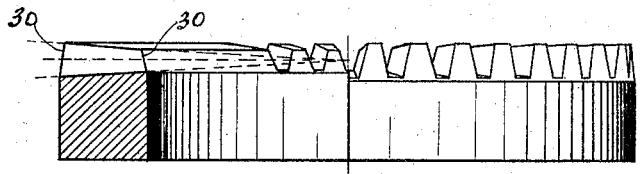
Fig. 3 is a similar view of a crown die.

In my Patent No. 1,240,916 the die roll illustrated and described is a conventional crown gear, its teeth being constructed on a pitch plane and having flat faces, like the teeth of a rack. Fig. 3 of the present application illustrates this kind of a die roll. Fig. 2 illustrates a die roll which differs from that of Fig. 3 in that its teeth are constructed on a cone of low altitude, instead of a plane. But the teeth have flat faces, the same as those of Fig. 3.

Figure 5:
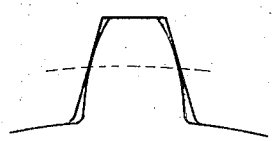
Fig. 5 is a fragmental view showing the relative shapes of two different kinds of gear teeth, one of which is my improved tooth.

According to the theory of involute gears, the faces of the teeth in the die shown in Fig. 2 should be slightly curved. But since the faces of the teeth in this die are flat, it follows that teeth generated with the die will not conform strictly to the involute principle. Beginning at the pitch line, where they will be of the correct thickness, the generated teeth will be relieved; that is, slightly thinner, both above and below the pitch line than they would be were they generated with a die having true involute teeth. And this modification of the generated teeth will be equal to the prominence of the faces of the die teeth. This can be better understood by reference to Fig. 5, where a tooth having curved faces is superposed on a tooth having flat faces, both teeth having the same pitch line thickness. This illustrates, exaggeratedly, the difference between the teeth of the die shown in Fig. 2 and what the shape of the teeth would be if they were truly involute. Since the teeth generated on the blank are conjugate to the die teeth, teeth generated with the die shown in Figure 2 will be as much thinner than true involute teeth, above and below the pitch line, as the faces of the die teeth are more prominent than those of true involute teeth. In other words, the relief of the generated teeth is complementary to the prominence of the faces of the die teeth.

Gears generated with a die such as that shown in Fig. 2; i. e., a slightly conical die with flat faced teeth, possess the property of running with extraordinary smoothness and noiselessness. When in operation the teeth of gears roll into and out of mesh successively, and there is a point at which each tooth must come into contact with a tooth of the mating gear. Where the teeth are true involutes the pressure between the teeth is as great at the beginning of their engagement as at any other time, and it naturally follows that the teeth come together with considerable impact. Rolling the teeth with a slightly conical die having flat faced teeth, relieves the teeth of the gear slightly at their addenda and dedenda and teeth of this kind come into engagement without the impact referred to. Their first contact is very light and the pressure then becomes gradually greater until it reaches its maximum. Naturally the separation of the teeth is also without shock.

Figure 4:
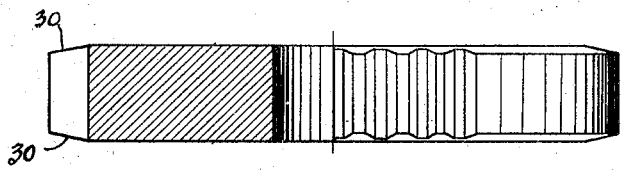
Fig. 4 is a face view, partly in section, of a die roll for spur gears having teeth of my improved form.

The desirable results already described, as obtainable with a conical die roll of low altitude and flat faced teeth, may also be obtained in rolling spur gears. I have already mentioned the extremely slight curvature of the tooth faces of gears having a large number of teeth. So in order to get any desired degree of relief on the teeth of spur gears I need only make my die roll of a definite diameter and make the faces of the teeth flat. For example, making the die with 150 teeth will produce a certain degree of relief on the teeth of the gears rolled with that die. With more teeth in the die the relief will be less, with fewer teeth the relief will be more. So by selection of the number of teeth in the die I am able to roll spur gears with any desired degree of relief on the teeth. In Fig. 4 I show a die, partly in section, for rolling spur gears. It shows straight sided teeth. In order to bring out these details more clearly the teeth are made large, with consequent reduction in the number of teeth. However, since the number of teeth depends on the diameter of the die it is evident that the die can be made any size that is wanted.

As I have previously stated, the rolling of the blank 11 in Fig. 1 has been completed, so this blank is, in fact, a gear. As it has been rolled with a die corresponding to the die shown in Fig. 2, i. e., a slightly conical die having teeth with flat faces, this gear has teeth of my improved form. Having been rolled in a holder and by the method described in my Patent No. 1,377,177, granted May 10, 1921, it is a shrouded gear. The contour of the teeth is therefore not as clearly shown as it would be if the shrouds were removed. This is immaterial, however, as the difference between the teeth having my improved form and true involute teeth is so slight as not to be visible to the eye. It can only be imagined by the aid of the diagram in Fig. 5.

While I have spoken only in terms of involute teeth, it is evident that the application of my invention is not limited to involute gears. Because of the ease with which involute dies can be made I prefer to work with gears made according to the involute system, but it is clear that my improvement is applicable to gears whose teeth are formed according to other systems of tooth construction. All systems of gear tooth formation have as their object the maintenance of uniform velocity ratio by two gears running with their teeth enmeshed. Take any given system, and beginning at the pitch line of the gear make the teeth gradually thinner than they would be if in strict conformity to the system to which the teeth belong, and the object of my invention will be attained. Where two such gears run together, each pair of teeth will assume its load gradually instead of suddenly, as is the case with ordinary gears. Furthermore, it is not necessary that both of a pair of gears have teeth of my improved form. One gear may be standard and the other with relieved teeth.

What I claim as my invention is as follows:

1. A bevel gear having straight teeth similar to involute teeth, but differing therefrom in that their addenda and dedenda become gradually thinner, beginning at the pitch line of the gear, than they would be were the tooth faces true involutes, such thinning of the teeth being insufficient to prevent their addenda and dedenda from functioning, but sufficient to enable the teeth to assume their load gradually, as described.

2. A gear having straight teeth similar to involute teeth, but differing therefrom in that their addenda and dedenda become gradually thinner, beginning at the pitch line of the gear, than they would be were the tooth faces true involutes, such thinning of the teeth being insufficient to prevent their addenda and dedenda from functioning, but sufficient to enable the teeth to assume their load gradually, as described.

3. A gear having straight teeth constructed according to a system of tooth construction whereby one gear is enabled to drive another at a uniform velocity ratio: the teeth of said gear having a form and proportions according to said system, except that from the pitch line of the gear the teeth become gradually thinner than they would be were they made strictly according to said system, such thinning of the teeth being insufficient to prevent their addenda and dedenda from functioning, but sufficient to enable the teeth to assume their load gradually, as described.

4. A bevel gear having straight teeth constructed according to a system of tooth construction whereby one gear is enabled to drive another at a uniform velocity ratio: the teeth of said gear having a form and proportions according to said system, except that from the pitch line of the gear the teeth become gradually thinner than they would be were they made strictly according to said system, such thinning of the teeth being insufficient to prevent their addenda and dedenda from functioning, but sufficient to enable the teeth to assume their load gradually, as described.

HAROLD N. ANDERSON.